(12) United States Patent
Nobel et al.

(10) Patent No.: US 6,565,190 B1
(45) Date of Patent: May 20, 2003

(54) INKJET PRINTING WITH UNIFORM WEAR OF INK EJECTION ELEMENTS AND NOZZLES

(75) Inventors: Gary M. Nobel, San Diego, CA (US); Nicholas Nicoloff, Jr., La Mesa, CA (US); Thomas M. Sabo, San Diego, CA (US); Clayton L. Holstun, San Marcos, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 1494 days.

(21) Appl. No.: 08/490,268

(22) Filed: Jun. 14, 1995

(51) Int. Cl.$^7$ ................................................. B41J 2/145
(52) U.S. Cl. ........................................................ 347/40
(58) Field of Search ............................... 347/40, 41, 43; 358/502

(56) References Cited

U.S. PATENT DOCUMENTS 5,429,441 A  * 7/1995 Schulz et al. .............. 347/40 X
5,512,923 A  * 4/1996 Bauman .................... 347/43 X

FOREIGN PATENT DOCUMENTS

EP          0253200       1/1988  ............. B41J/3/20

* cited by examiner

Primary Examiner—Hezron Williams
Assistant Examiner—C Dickens

(57) ABSTRACT

In one embodiment of the invention, an inkjet printer selectively energizes ink ejection elements in a scanning printhead such that the top nozzles of the printhead do not always print the first line of text in a scan. In one embodiment, this is accomplished by occasionally aligning the bottommost nozzle in the printhead with the bottom of the last full line of text to be printed during the scan. The alignment of the printhead with respect to the lines of text to be printed is varied from page to page or varied at other intervals so that the top nozzles and bottom nozzles are used about equally. This will also cause more uniform wear of the middle nozzles. The more uniform wearing of the nozzles and ink ejection elements extends the life of the printhead. In inkjet printers using a black ink printhead which has a wider printing swath than one or more color ink printheads in the same scanning carriage, a new printing technique makes use of the nozzles in the wider printhead which extend beyond the shorter printhead when both printheads are being used during color printing.

19 Claims, 8 Drawing Sheets

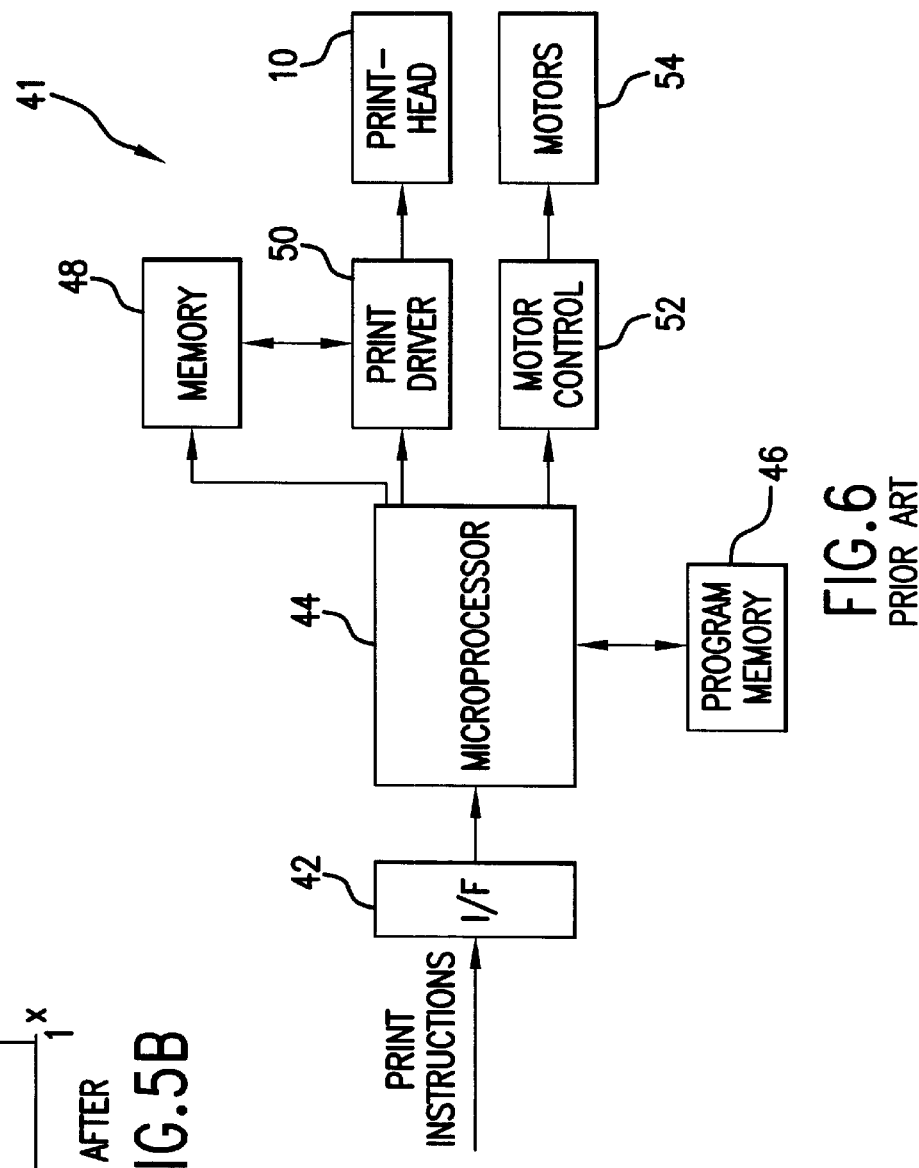
FIG. 6
PRIOR ART
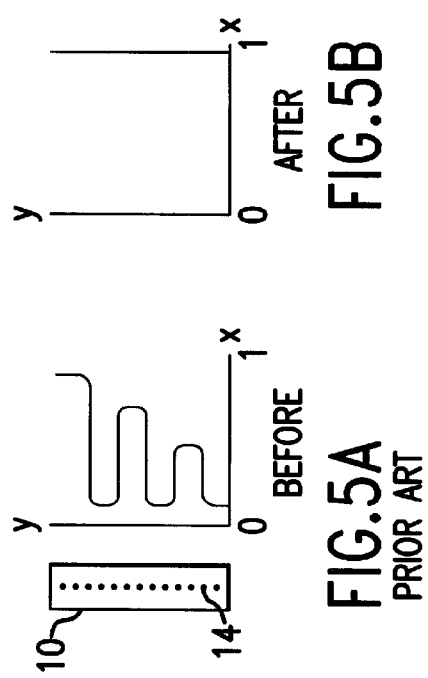
FIG. 5B
AFTER
FIG. 5A
PRIOR ART

INKJET PRINTING WITH UNIFORM WEAR OF INK EJECTION ELEMENTS AND NOZZLES

FIELD OF THE INVENTION

This invention relates to inkjet printers and, more particularly, to techniques for increasing the life of a printhead having ink ejection elements and nozzles.

BACKGROUND OF THE INVENTION

Inkjet printers are well known and widely used. These printers incorporate a scanning carriage which supports one or more inkjet print cartridges. Thermal inkjet print cartridges operate by rapidly heating a small volume of ink to cause the ink to vaporize and be ejected through one of a plurality of orifices or nozzles so as to print a dot of ink on a recording medium, such as a sheet of paper. Typically, the orifices are arranged in one or more linear arrays in a nozzle member. The properly sequenced ejection of ink from each orifice causes characters or other images to be printed on the paper as the printhead is moved relative to the paper. The paper is typically shifted each time the printhead is moved across the paper. The thermal inkjet printer is fast and quiet, as only the ink strikes the paper. One type of thermal printhead is described in U.S. Pat. No. 5,278,584, entitled "Ink Delivery System for an Inkjet Printhead," by Brian Keefe, et al., assigned to the present assignee and incorporated herein by reference.

A related type of inkjet printer uses piezo-electric elements, instead of heaters, to eject ink from an associated orifice. The present invention applies to both thermal and nonthermal inkjet printers.

One nonobvious drawback of such inkjet printers is that the ink ejection elements, whether heater resistors or piezo-electric elements, and their associated nozzles wear unevenly due to the nonuniform use of the various ink ejection elements and nozzles in the scanning printhead.

For example, in high-quality printing modes, only full lines of text are printed before the paper is shifted. A line of text will not be printed in two scans interrupted by a shifting of the paper. This is because the paper shifting mechanism would cause some noticeable misalignment between the dots forming characters printed in two consecutive scans interrupted by a shifting of the paper.

This full line printing mode is illustrated in FIG. 1, where a-single printhead 10 is shown making three scans across a sheet of paper, where the paper is shifted in the direction 12 after each scan. Three printed swaths are shown. Nozzles 14 in printhead 10 eject droplets of ink, and ink ejection elements below nozzles 14 are selectively fired to print full lines of text 16–20, shown as shaded bands. Although this example assumes a single scan before shifting the paper, the problem described would also occur if multiple scans were required for printing before the paper was shifted. A single scan may be in either direction across the paper.

After each scan, the paper is shifted so that the top of printhead 10 aligns with the first line of text 16, 18, 20 to be printed during the next scan.

If the bottom few nozzles 14 of printhead 10 cannot completely print a line of text during a single scan, then printing by the bottom nozzles is prevented or masked. The nozzles 14 below the top group of nozzles 14 frequently align with a space between the lines of text and so these middle nozzles 14, on average, are not used as frequently as the top nozzles 14. The third swath consisting of one line of text represents the end of a paragraph or the end of a page, so only the top nozzles 14 are used.

As seen, the nozzles and ink ejection elements at the top end of printhead 10 are used more frequently than the nozzles and ink ejection elements at the bottom and middle of printhead 10. This nonuniform use is reinforced many times per page since the top nozzles are always aligned with the first line to be printed in a scan.

The thermal, mechanical, chemical and frictional forces on the ink ejection elements and nozzles when ejecting ink cause nonuniform wear of these elements and nozzles. Such uneven wear effects both the drop volume and dot position accuracy and, thus, would require the inkjet print cartridge to be replaced sooner than if the ink ejection elements and nozzles had uniform wear. In extreme cases of such uneven wear, individual elements and nozzles may stop functioning entirely prior to the predicted replacement time.

Uneven wear also occurs due to the nature of type fonts because certain frequently used letters require more firing from some nozzles than from others during scanning of the printhead.

In certain recent printers (not necessarily prior art), a high resolution black ink printhead (e.g., one-half inch wide) is capable of printing a swath which is wider than one or more lower resolution color ink printheads (e.g., one-third inch wide) mounted in the same scanning carriage next to the black ink printhead. FIG. 2 shows such a black ink printhead 24 and a color ink printhead 26 scanning along direction 27.

When printing text or otherwise printing solely with black ink, the nozzles 28 and ink ejection elements in the black ink printhead 24 suffer from uneven wear as previously described. Additionally, when the black ink printhead 24 is used along with the color ink printhead 26 during color printing, only the shaded portions of printheads 24 and 26 are used, while the unshaded portion 30 of printhead 24 is not used. This, of course, results in uneven wear of the nozzles and ink ejection elements in the black ink printhead 24.

What is needed is a technique for printing which results in more uniform wear of the nozzles and ink ejection elements in inkjet printheads.

SUMMARY

In one embodiment of the invention, an inkjet printer selectively energizes ink ejection elements in a scanning printhead such that the top nozzles of the printhead do not always print the first line of text in a scan. In one embodiment, this is accomplished by occasionally aligning the bottommost nozzle in the printhead with the bottom of the last full line of text to be printed during the scan. Also, nozzles which would normally print in the middle of the top line of text can be used to print the top rows of dots in the top line of text in a scan. This causes the nozzles which previously aligned with a space between text to be used more frequently to even out the nozzle usage.

The alignment of the printhead with respect to the lines of text to be printed is varied from page to page or varied at other intervals so that the top nozzles, middle nozzles, and bottom nozzles are used about equally.

The advancement of the paper through the print zone is controlled in conjunction with the selective control of the ink ejection elements to bring about the above-mentioned results.

The more uniform wearing of the nozzles and ink ejection elements extends the life of the printhead. This becomes more important with non-replaceable printheads which are not disposed of once a reservoir of ink is depleted.

In inkjet printers using a black ink printhead which has a wider printing swath than one or more color ink printheads in the same scanning carriage, a new printing technique makes use of the nozzles in the wider printhead which extend beyond the shorter printhead when both printheads are being used, such as for color printing. In this technique, a selected first pattern of ink ejection elements in the wider printhead extending beyond the shorter printhead is enabled during odd numbered firing cycles in a scan, while an opposite pattern of ink ejection elements at the other end of the wider printhead is enabled. During the even numbered firing cycles in a scan, the patterns are reversed. The paper is shifted after each scan such that the partial printing by the first pattern is overlapped by the partial printing by the opposite pattern in a subsequent scan. By overlapping these patterns, a full printing of dots results. The selective enabling (or disabling) of the ink ejection elements is performed by a print mask used in conjunction with the printing algorithm.

In another embodiment, the enabled patterns require more than two printing overlaps for full printing.

BRIEF DESCRIPTION OF THE DRAWINGS

FIGS. 5A and 5B present graphs illustrating the more uniform wear of ink ejection elements and nozzles in the printheads of FIGS. 3 and 4.

FIG. 6 is a functional block diagram of the pertinent portions of an inkjet printer which has been modified in accordance with the present invention to cause more uniform wear of the ink ejection elements and nozzles in a printhead.

DETAILED DESCRIPTION OF THE PREFERRED EMBODIMENTS

Figure 1:
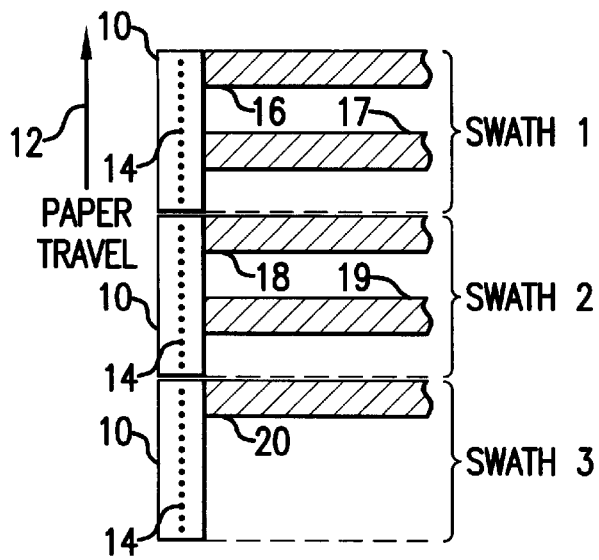
FIG. 1 is a front view of a conventional nozzle member of a single printhead and the printed swaths produced during three consecutive printing scans, where the recording medium is shifted after each scan, to illustrate how uneven wear of the nozzles results.
Figure 3:
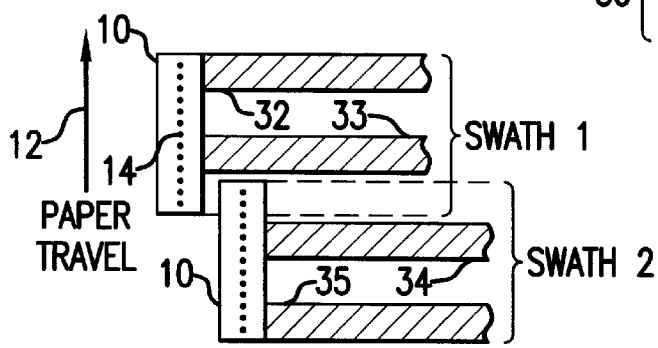
FIGS. 3 and 4 illustrate the printhead of FIG. 1 and the recording medium being controlled in accordance with certain embodiments of the invention to cause more uniform use of the nozzles along the length of the printhead.

FIG. 3 shows the printhead 10 of FIG. 1 and printed lines of text 32–35 printed during two scans of printhead 10. In the embodiment of FIG. 3, the firing of the ink ejection elements (not shown) underlying the various nozzles 14 in printhead 10, and the drive motor for positioning the recording medium, are controlled in a novel manner to achieve more uniform wear of the ink ejection elements and nozzles along the length of printhead 10.

In FIG. 3, two full lines of text 32 and 33 are shown printed during a first scan of printhead 10. During this first scan, the top nozzles 14 in printhead 10 are shown aligned with the first line of text 32 to be printed. In another embodiment, nozzles other than the top nozzles print the top line of text 32 in the first scan.

In a conventional printer, the paper or other recording medium would be shifted upwards (in direction 12) after this first scan so that the next line of text would be printed by the topmost nozzles of the printhead 10. However, as described with respect to FIG. 1, this causes the top nozzles of printhead 10 to be used more than the middle and bottom nozzles. To avoid this uneven wear, the paper transport drive motor (a stepper motor) is controlled to transport the paper across the print zone so that the first line of text 34 to be printed in the scan is printed with those nozzles 14 in printhead 10 which are more centrally located along printhead 10. In one embodiment, the nozzles which would normally print in the middle of the top line of text in a scan are used to print the top rows of dots in the top line of text during a scan. This causes the nozzles which were previously aligned with a space between the lines of text to be used more frequently.

By not starting printing using the top nozzles during every scan, the wearing of the top nozzles and ink ejection elements can be controlled to be about the same as the remainder of the nozzles and ink ejection elements in printhead 10.

In subsequent scans, any of the nozzles in printhead 10 may be used to print the first line of text during the scan. In one embodiment, the nozzles used for printing the top line of a scan only change from page to page. In another embodiment, the selection of those nozzles varies during printing of a page.

Figure 4:
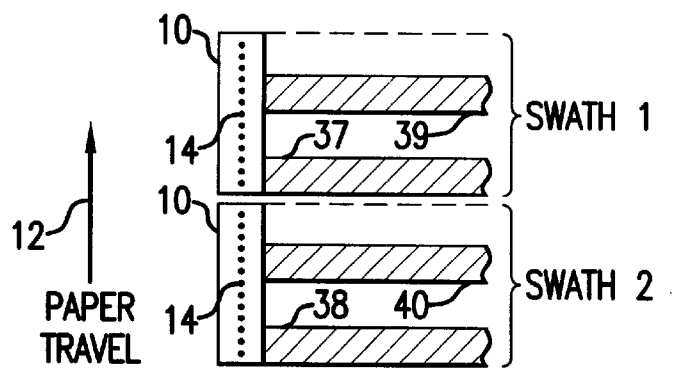

FIG. 4 illustrates another example of a technique for promoting uniform wear of the ink ejection elements and nozzles which may be used in conjunction with the method of FIG. 3. In FIG. 4, the position of the recording medium for selected scans is set such that the bottom complete line of text 37 or 38 in a single swath of the printhead 10 is printed by the bottommost nozzles 14 in the printhead 10. The top lines of text 39 and 40 during a scan are also shown in FIG. 4. Using this mode will cause the bottom nozzles to be used more often than the top nozzles to even out the wear of the nozzles along the length of the printhead 10. Also, by forcing usage of the bottommost nozzles, the more heavily used middle nozzles are slightly repositioned into areas of lower usage, and the less frequently used middle nozzles are repositioned into areas of higher usage.

On alternate pages or at other predetermined or random times, the top nozzles or other group of nozzles will be aligned with the first, last, or other full line of text to be printed during a scan.

The concepts illustrated herein for promoting uniform wear along the length of the printhead 10 apply equally to those printers which require a printhead to make multiple scans, while the paper is held fixed, to complete a printing operation.

FIGS. 5A and 5B illustrate the relative use of nozzles 14 along the length of printhead 10 during printing over an extended period of time, where the y axis corresponds to the physical positions of the nozzles 14 along the length of printhead 10, and the x axis corresponds to the relative use of the nozzles 14 for printing. As seen in the "Before" graph of FIG. 5A, the conventional printing methods cause the topmost nozzles to be used the greatest amount, followed by the middle group of nozzles and the bottommost nozzles.

In the "After" graph of FIG. 5B, the positions of the nozzles 14 versus their relative use using the present invention is plotted, which shows the increased use of the bottom nozzles and certain middle nozzles (as compared to the "Before" graph) in combination with the selective non-use of the top nozzles. The various techniques above can be used to increase or decrease the use of any group of nozzles to achieve uniform wear. A trade-off may have to be made between achieving uniform wear of the ink ejection elements and nozzles and the speed at which an entire page can be printed.

FIG. 6 is a simplified embodiment of the circuitry in a printer 41 used to control printhead 10 and the paper transport drive motor. Such circuitry and the control software would be understood by those skilled in the art after reviewing this disclosure. In FIG. 6, instructions for a printing operation are applied to a buffer 42 or other interface device. These instructions are then processed by a microprocessor 44. The microprocessor 44, under the control of a program stored in a memory 46, stores data to be printed in a bit mapped memory 48. Microprocessor 44 controls a print driver 50 which retrieves data from memory 48 and provides control signals to printhead 10 for selectively firing various ink ejection elements. Microprocessor 44 also provides information to the motor control unit 52 regarding the required paper transport through the print zone after each scan of the printhead 10 across the paper. One or more motors 54, under the control of the control unit 52, transport the paper the required amount through the print zone after each scan. The hardware described in FIG. 6 may be that found in conventional inkjet printers. Accordingly, the hardware of FIG. 6 is identified as prior art.

Implementation of the present invention may be in the form of modifying the program memory stored in memory 46 to cause printhead 10 and the paper transport motors 54 to begin printing the first line of text in a swath using other than the top nozzles in printhead 10, as previously described. Modification of the existing print driver 50, control unit 52, and other logic may also be required depending on the particular hardware used. Those of ordinary skill in the art will be able to suitably modify the conventional printer program code and control circuits after reading this disclosure.

Figure 7:
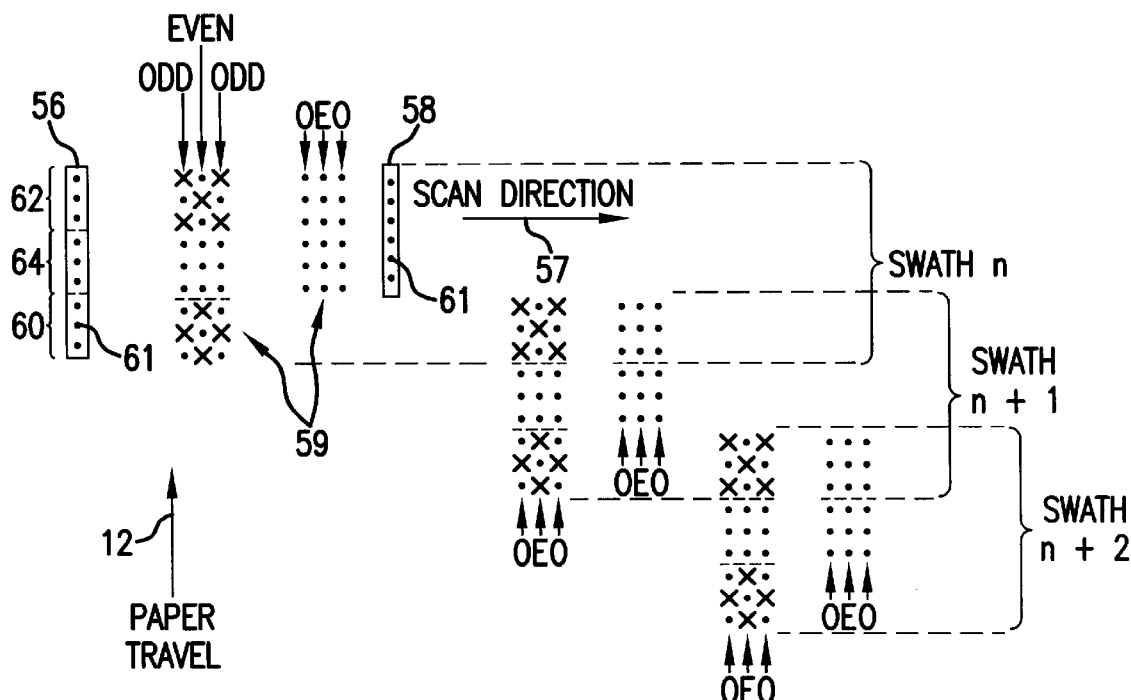
FIG. 7 illustrates the dot patterns printed by the printheads of FIG. 2 in accordance with one embodiment of the invention to cause more uniform wear of the ink ejection elements and nozzles in the wider printhead.

FIG. 7 illustrates another technique for promoting uniform wear of ink ejection elements and nozzles when a wide printhead 56 having a width of, for example, one-half inch is used in conjunction with a second printhead 58 having a shorter width, such as one-third inch. Such may be the case in a color inkjet printer where a high resolution black ink printhead 56 is used primarily for high quality text, and a color ink printhead 58 is a lower resolution printhead for use in printing color graphics. Both the black ink printhead 56 and the color ink printhead 58 are arranged side-by-side in a scanning carriage and would be used together when printing color ink and black ink on a single page. Printing may occur during scanning in either direction across the recording medium. Color ink printhead 58 may consist of a tri-color printhead or may be one of three color ink printheads, each ejecting a different primary color ink. Such primary colors may consist of magenta, cyan, and yellow ink.

Figure 2:
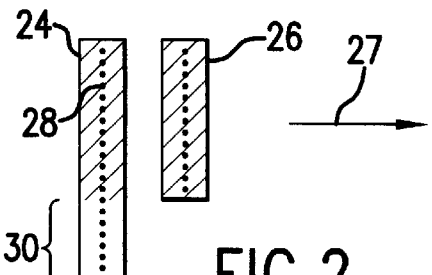
FIG. 2 is a front view of the nozzle members of a high resolution black ink printhead and a color ink printhead mounted in a scanning cartridge, where the black ink printhead is wider than the color printhead, illustrating how uneven wear of the nozzles in the wider printhead may result.

As is described with respect to FIG. 2, when both color ink and black ink are to be printed, the bottom portion 30 of the wide printhead 24 would not be used in existing printers since the printing swath of printhead 24 is limited to the width of the color ink printhead 26. Thus, there will be uneven wear of the nozzles 28 and ink ejection elements in printhead 24 if the printer is frequently used for color printing.

The technique shown in FIG. 7 avoids such uneven wear. The nozzle array in each of printheads 56 and 58 is assumed to be one column of nozzles 61 for simplicity. The concepts described with respect to FIG. 7 may be applied to any nozzle arrangement such as a nozzle array comprised of two or more offset columns of nozzles.

FIG. 7 illustrates the dot patterns 59 printed by the enabled ink ejection elements in printheads 56 and 58 in three consecutive firing cycles (odd, even, odd) during each of three consecutive scans. Only three firing cycles are shown for simplicity, and a full printed swath (n or n+1 or n+2), resulting from 300 or more firings per inch, would contain a page wide dot pattern. A scanning direction of printheads 56 and 58 across the recording medium is shown by arrow 57.

In FIG. 7, during printing using printheads 56 and 58, all of the ink ejection elements in the color ink printhead 58 are enabled and, in the section 60 of printhead 56 which extends beyond the length of the color ink printhead 58, only a subset of the ink ejection elements is enabled during each firing cycle. The disabled ink ejection elements during each firing cycle correspond to an X in the printed dot patterns and are disabled using a software print mask incorporated into the program memory 46 in FIG. 6. In the particular simplified example of FIG. 7, only two of-the three ink ejection elements in section 60 are enabled during the odd firing cycles, forming a first dot pattern during these odd cycles. The particular pattern of enabled ink ejection elements in section 60 is not critical.

In a top section 62 of printhead 56, a subset of the ink ejection elements is enabled during the odd firing cycles which forms a dot pattern opposite to the first dot pattern printed by section 60. In the simplified example in FIG. 7, only one of the three ink ejection elements in section 62 is enabled during the odd firing cycles. The section 62 has the same size as section 60 for purposes as will be seen later.

The middle section 64 between sections 60 and 62 is completely enabled.

In the next firing cycle (an even cycle), the enabled ink ejection elements in sections 60 and 62 are reversed to produce the dot pattern shown during the even firing cycle. The enabled ink ejection elements in sections 60 and 62 are again reversed for the next firing cycle (odd) and so on.

Thus, in the first scan, an incomplete printed dot pattern of black ink is printed on the recording medium by sections 60 and 62.

After this first scan, the recording medium is shifted upwards in direction 12 by a distance equivalent to the width of the color ink printhead 58, and the printheads 56 and 58 are again scanned. During this second scan, the selective enablement (or masking) of the ink ejection elements in sections 60 and 62 is repeated so that the black ink now printed by the top section 62 of printhead 56 fills-in the black ink pattern previously printed by section 60 during the last scan. This selective masking of the ink ejection elements is repeated in the third scan, and so on.

For the first scan on a page, either the print masked bottom section 60 is used to print the top lines of a page or all ink ejection elements in top section 62 is enabled and used to print the top lines of a page.

Using this technique, nozzles in the bottom section 60 are utilized during color printing which would not have been utilized in the conventional printing methods. Additionally, the overlap of dots in two or more scans results in less ink bleed and paper cockle than in the method described with respect to FIG. 2.

A similar technique of overlapping dot patterns in two or more consecutive scans to create a full dot pattern may be used with nozzle arrays having any arrangement and with any complementary patterns of enabled ink ejection elements. This technique may also be applied no matter where the smaller printhead 58 is located along the width of printhead 56, just as long as complementary patterns of enabled ink ejection elements are used.

Figure 8A:
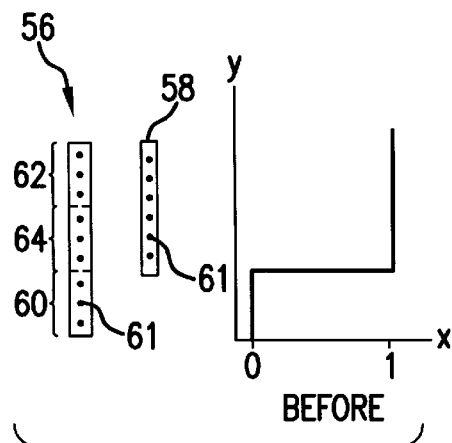
FIGS. 8A and 8B present graphs illustrating the more uniform wear of ink ejection elements and nozzles in the wider printhead of FIG. 7.
Figure 8B:
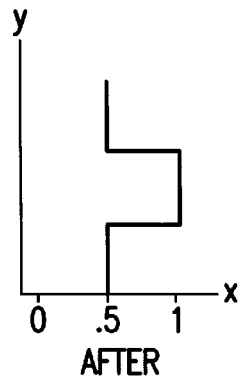

FIGS. 8A and 8B graphically illustrate the long term relative nozzle usage along the length of the wider printhead 56 using the conventional technique ("Before" graph), described with respect to FIG. 2, versus the technique ("After" graph) described with respect to FIG. 7.

Figure 9:
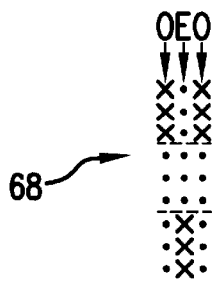
FIG. 9 illustrates the dot patterns printed by the wider printhead of FIG. 2 when controlled using another embodiment of the invention to cause more uniform wear of the ink ejection elements and nozzles in the wider printhead.

FIG. 9 illustrates another dot pattern 68 printed during three firing cycles of selectively masked ink ejection elements in printhead 56 which may be used instead of the pattern shown in FIG. 7.

Figure 10:
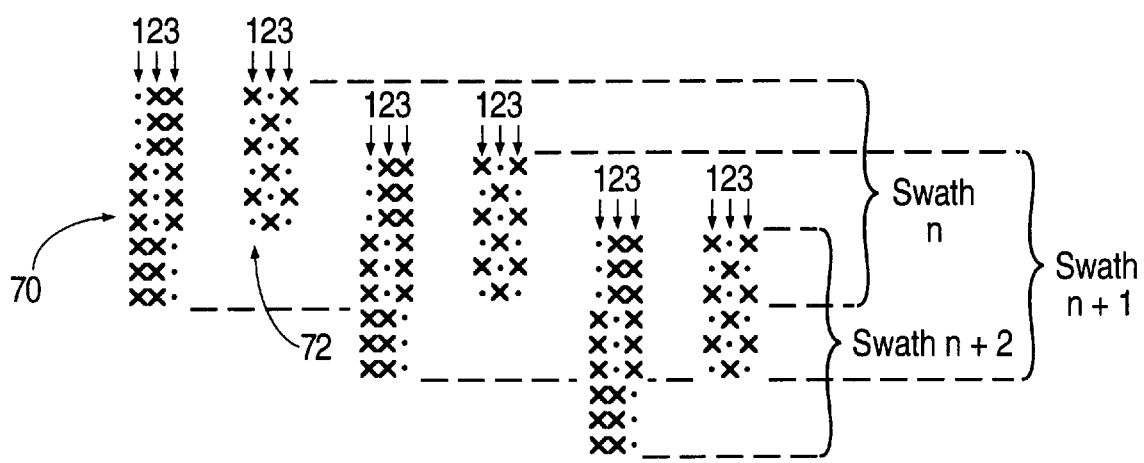
FIG. 10 illustrates the dot patterns printed by the printheads of FIG. 2 when controlled using yet another embodiment of the invention to cause more uniform wear of the ink ejection elements and nozzles in the wider printhead.

FIG. 7 illustrated a two-pass technique where two scans were needed to fill-in a dot pattern printed by section 60 or 62. FIG. 10 illustrates an extension of this concept where three overlapping passes of the wider printhead 56 are needed to fill-in a dot pattern 70 printed by section 60, 62, or 64, while two overlapping passes of the smaller printhead 58 are needed to fill-in a color dot pattern 72. The printing operation illustrated in FIG. 10 is similar to that described with respect to FIG. 7 except that the recording medium is shifted one-half the width of printhead 58 after each scan, and the selective masking of the ink ejection elements repeats after each group of three (1, 2, 3) consecutive firing cycles.

The concept of FIGS. 7 and 10 may be extended to a system which requires any number of overlapping passes of the sections of the wider printhead 56 and sections of the shorter printhead 58. Using such a concept, more uniform wear of the ink ejection elements and nozzles is achieved. Existing printer circuitry and mechanisms may be used to implement the inventions, since the required modifications primarily relate to the control of the existing printheads and paper feed mechanisms. Such modifications may be achieved through software (including firmware) changes to existing systems.

Additional detail regarding state of the art printheads may be obtained from U.S. Pat. Nos. 5,278,584 and 5,408,746 and patent application Ser. No. 08/399,398, entitled "Alignment of Differently Sized Printheads in a Printer," all assigned to the present assignee and incorporated herein by reference.

Figure 11:
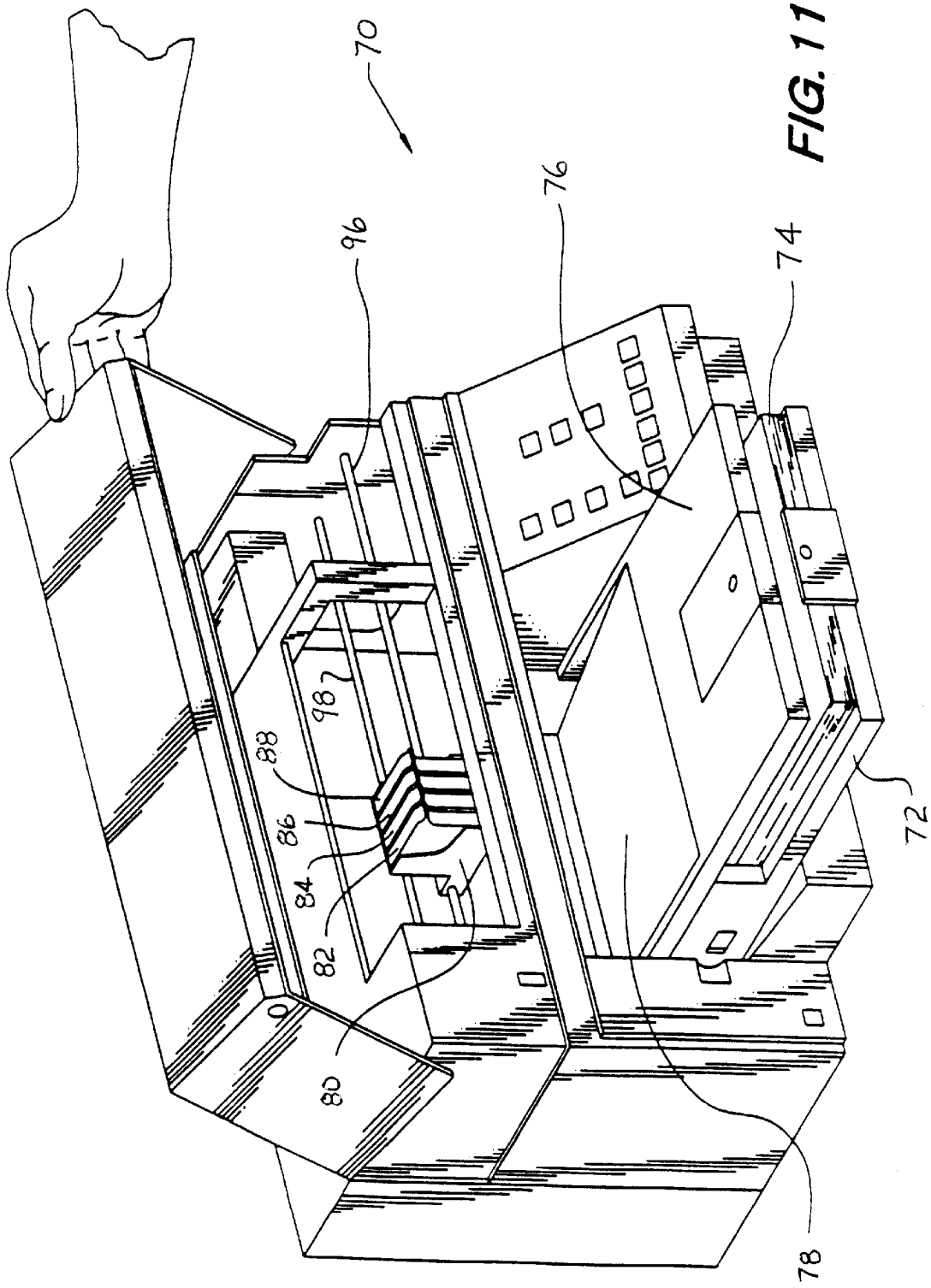
FIG. 11 illustrates an inkjet printer incorporating the present invention.
Figure 12:
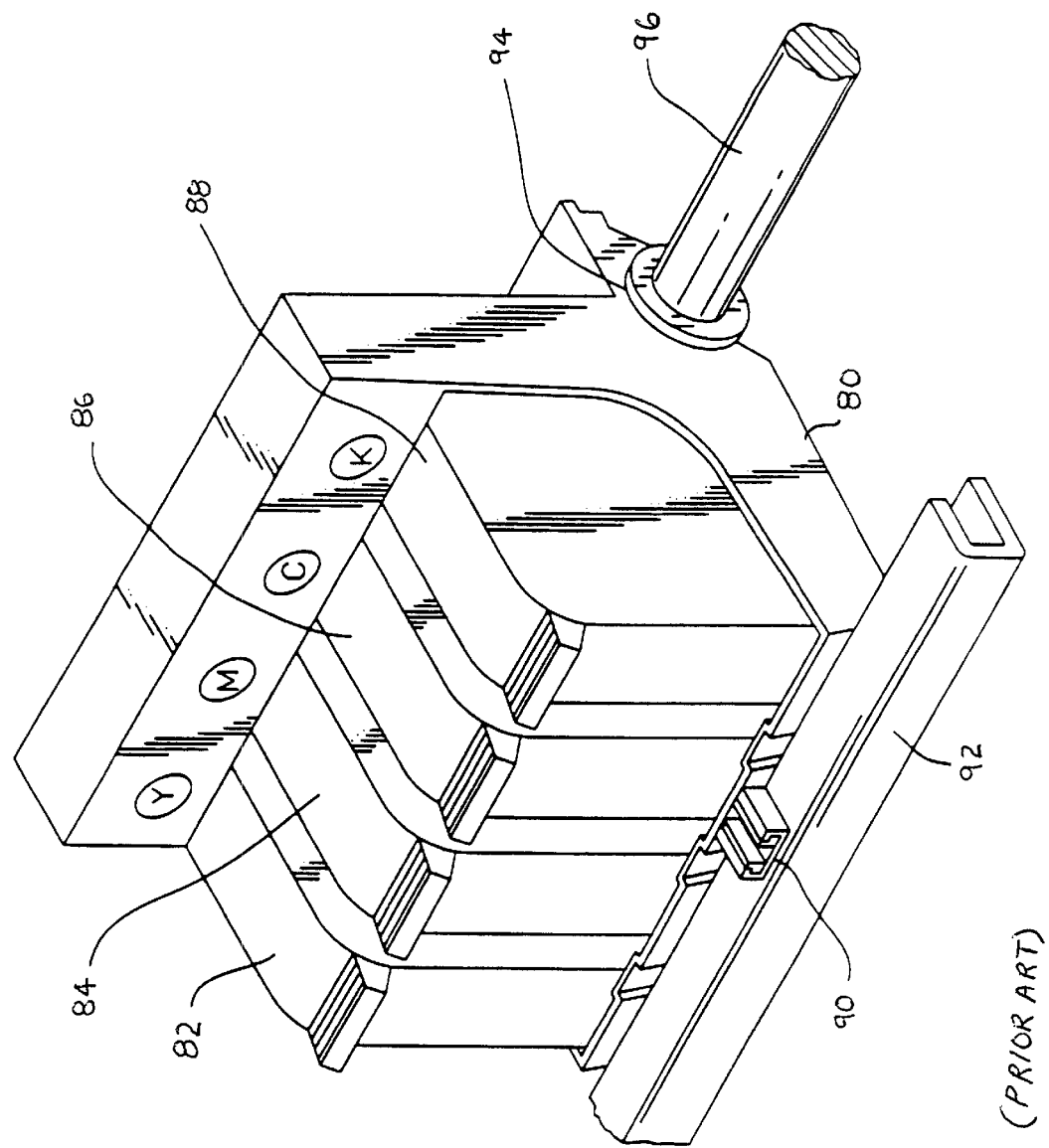
FIG. 12 illustrates prior art print cartridges installed in a prior art scanning carriage.

One embodiment of the invention is incorporated in an inkjet printer of the type shown in FIG. 11. FIGS. 11–14 are further disclosed in application Ser. No. 08/399,398, previously identified. One skilled in the art would understand how to modify such a printer to implement the present invention. In particular, inkjet printer 70 includes an input tray 72 containing sheets of media 74 which pass through a print zone and are fed past an exit 78 into an output tray 76. Referring to FIGS. 11 and 12, a movable carriage 80 holds print cartridges 82, 84, 86, and 88 which respectively hold yellow (Y), magenta (M), cyan (C) and black (K) inks. The front of the carriage has a support bumper 90 which rides along a guide 92 while the back of the carriage has multiple bushings, such as bushing 94, which ride along slide rod 96. The position of the carriage as it traverses back and forth across the media is determined from an encoder strip 98 in order to be sure that the various ink nozzles on each print cartridge are selectively fired at the appropriate time during a carriage scan.

Figure 13:
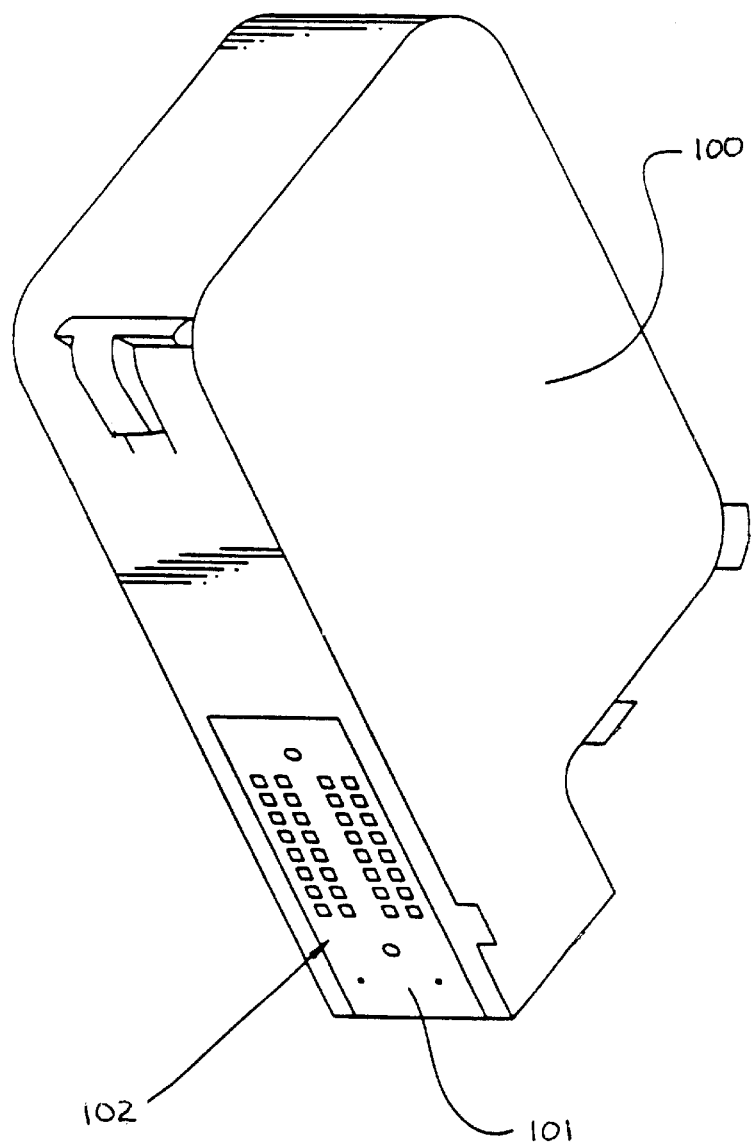
FIG. 13 illustrates prior art print cartridge.

Referring to FIG. 13, an inkjet cartridge 100 having a TAB circuit 101 with an electrical interconnect 102 is removably installed in four chutes of carriage 80 (FIG. 12). Each of the chutes contains a flex circuit 112 (FIG. 14) containing conductive pads for operative engagement with the cartridge pads when the cartridge is inserted into its appropriate chute.

Figure 14:
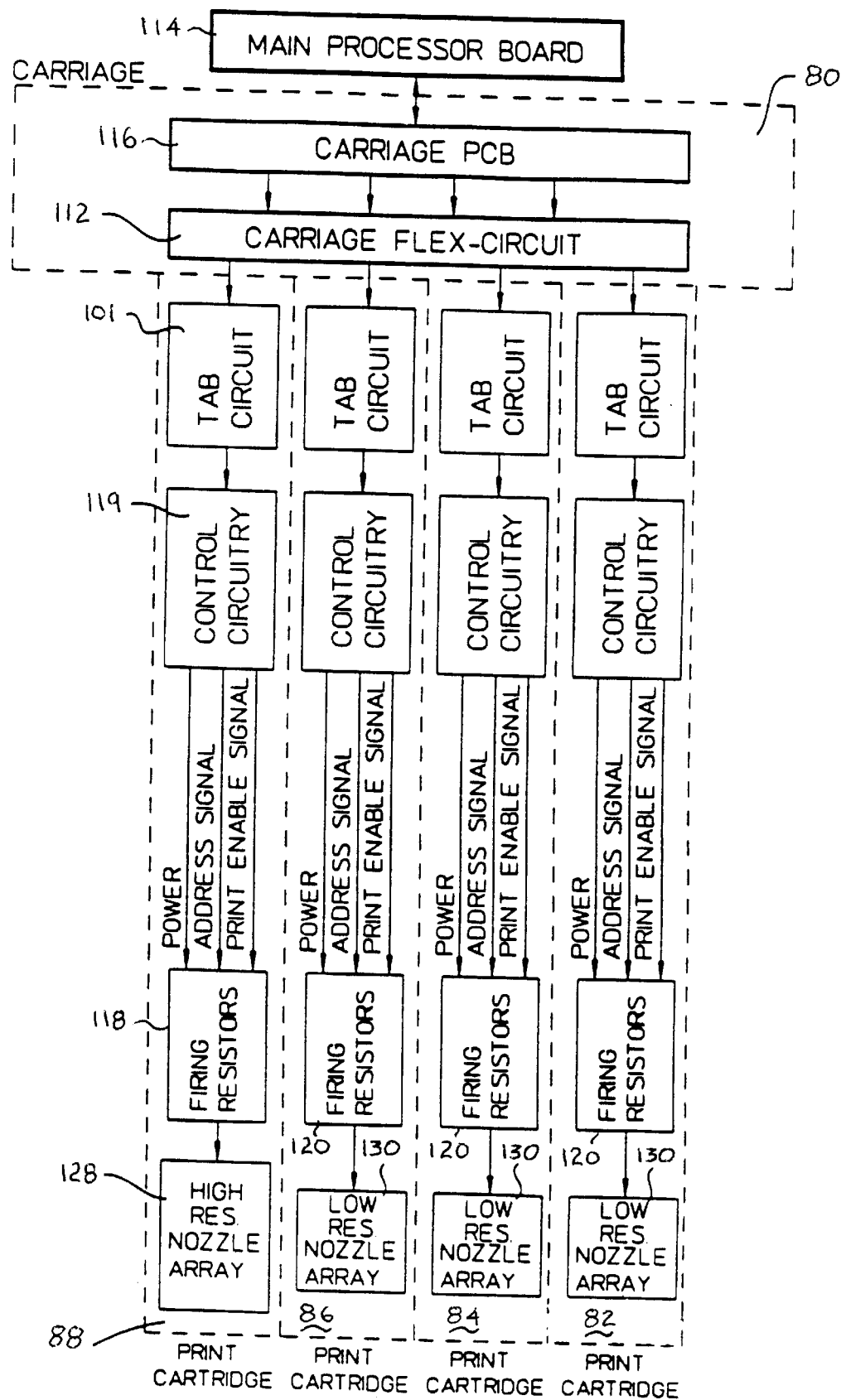
FIG. 14 illustrates the printer, carriage, and print cartridge electronics in one embodiment of the invention.

FIG. 14 is a functional diagram of the printer, carriage, and print cartridge electronics. The printer contains a main processor board 114 for processing signals. The carriage 80 contains a printed circuit board (PCB) 116 for further processing of signals. The carriage PCB 116 is connected to control circuitry 119 in the print cartridge 82, 84, 86, 88 via the carriage flex circuit 112 and the print cartridge TAB circuit 101. Control circuitry 119 (including a multiplexer) on the printhead substrate enables the, for example, three hundred firing resistors 118 of the black printhead to be controlled through fifty-two electrical interconnect pads, and similarly enables, for example, all one hundred four firing resistors 120 of each color printhead to be controlled through thirty-two electrical interconnect pads. The black printhead nozzle array 128 and the color printhead nozzle array 130 are also identified.

While particular embodiments of the present invention have been shown and described, it would be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A printing method for achieving more uniform wear of nozzles in an inkjet printhead, each of said nozzles having an associated ink ejection element which is energized to cause a droplet of ink to be expelled through an associated nozzle, said method comprising the steps of:

selectively energizing ink ejection elements in said printhead during one or more first scans of said printhead across a recording medium, wherein certain ones of said ink ejection elements during said one or more first scans are energized more frequently than other ink ejection elements in said printhead;

transporting said recording medium through a print zone such that an area to be printed upon during one or more second scans of said printhead resides in said print zone; and selectively energizing ink ejection elements in said printhead during said one or more second scans of said printhead across said recording medium to cause said certain ones of said ink ejection elements to be used less frequently than in said one or more first scans, and to cause said other ink ejection elements to be used more frequently than in said one or more first scans so as to achieve more uniform wear of all ink ejection elements and nozzles in said printhead.

2. The method of claim 1 wherein said one or more first scans are made across a first sheet of said recording medium, and said one or more second scans are made across a second sheet of said recording medium.

3. The method of claim 1 wherein, during said one or more second scans, said certain ones of said ink ejection elements are disabled.

4. The method of claim 1 wherein said step of selectively energizing said ink ejection elements during said one or more first scans comprises selectively energizing the topmost ink ejection elements in said printhead such that the topmost ink ejection elements during said one or more first scans are used to print a first line of text on said recording medium during each of said one or more first scans.

5. The method of claim 4 wherein said step of selectively energizing said ink ejection elements during said one or more second scans comprises selectively energizing the bottommost ink ejection elements in said printhead such that the bottommost ink ejection elements during said one or more second scans are used to print a last line of text on said recording medium during each of said one or more second scans.

6. A printing method for achieving more uniform wear of nozzles in a first printhead, each of said nozzles having an associated ink ejection element which is energized during a firing cycle to cause a droplet of ink to be expelled through an associated nozzle, said first printhead having a width dimension being perpendicular to a direction of scanning said first printhead across a recording medium, said first printhead being mounted in a scanning carriage in an inkjet printer alone with a second printhead in a side-by-side relationship, said first printhead having a width which is greater than a width of said second printhead, wherein said first printhead elects droplets of ink and said second printhead elects droplets of ink while scanning across said recording medium, a portion of said width of said first printhead extending beyond said width of said second printhead, said first printhead having ink election elements in a first end section, a middle section, and a second end section, said middle section being between said first end section and said second end section, said method comprising the steps of:

(1) selectively energizing ink ejection elements within a subset of ink ejection elements in said first end section of said first printhead and disabling all other ink election elements within said first end section at various times during a first scan as said first printhead is scanned across a recording medium to print a first partial printed pattern by said subset;

(2) selectively energizing ink ejection elements within a subset of ink election elements in said second end section of said first printhead and disabling all other ink election elements within said second end section at various times during said first scan as said first printhead is scanned across said recording medium to print a second partial printed pattern by said substrate;

(3) selectively energizing ink election elements in said middle section of said first printhead;

(4) transporting said recording medium a distance through a print zone, said distance being a fraction of said width of said first printhead;

(5) repeating said steps (1), (2), and (3) for subsequent scans across said recording medium, wherein said first partial printed pattern in a scan N is further or totally completed by the overlap of said second partial printed pattern in a subsequent scan.

7. The method of claim 6 wherein said first printhead ejects droplets of black ink and said second printhead ejects droplets of color ink.

8. The method of claim 6 wherein said first partial printed pattern is totally completed by said second partial printed pattern in two scans of said first printhead.

9. The method of claim 6 wherein each scan of said first printhead across said medium consists of even and odd firing cycles, and wherein different subsets of ink ejection elements are disabled in said first end section and said second end section for the even and odd firing cycles.

10. The method of claim 6 wherein said step of selectively energizing ink ejection elements in said middle section comprises selectively energizing any ink ejection elements in said middle section.

11. An inkjet printer comprising:

a scanning printhead having nozzles, each of said nozzles having an associated ink ejection element which is energized to cause a droplet of ink to be expelled through an associated nozzle;

an ink ejection element control device which selectively energizes ink ejection elements in said printhead during one or more first scans of said printhead across a recording medium, wherein certain ones of said ink ejection elements during said one or more first scans are energized more frequently than other ink ejection elements in said printhead;

a drive motor which transports said recording medium through a print zone such that an area to be printed upon during one or more second scans of said printhead resides in said print zone; and a drive motor control device which controls said drive motor, wherein said ink ejection element control device also selectively energizes ink ejection elements in said printhead during said one or more second scans of said printhead across said recording medium to cause said certain ones of said ink ejection elements to be used less frequently than in said one or more first scans, and to cause said other ink ejection elements to be used more frequently than in said one or more first scans so as to achieve more uniform wear of all ink ejection elements and nozzles in said printhead.

12. The printer of claim 11 wherein said drive motor control device controls said drive motor such that said one or more first scans are made across a first sheet of said recording medium, and said one or more second scans are made across a second sheet of said recording medium.

13. The printer of claim 11 wherein, during said one or more second scans, said ink ejection control device causes said certain ones of said ink ejection elements to be disabled.

14. The printer of claim 11 wherein said ink ejection element control device selectively energizes the topmost ink ejection elements in said printhead during said one or more first scans such that the topmost ink ejection elements during said one or more first scans are used to print a first line of text on said recording medium during each of said one or more first scans.

15. The printer of claim 14 wherein said ink ejection element control device selectively energizes the bottommost ink ejection elements in said printhead during said one or more second scans such that the bottommost ink ejection elements during said one or more second scans are used to print a last line of text on said recording medium during each of said one or more second scans.

16. An inkjet printer comprising:

a scanning first printhead having nozzles, each of said nozzles having an associated ink ejection element which is energized during a firing cycle to cause a droplet of ink to be expelled through an associated nozzle, wherein said first printhead is mounted in a scanning carriage in said printer along with a second printhead, said first printhead having a width which is greater than a width of said second printhead, said width being a dimension perpendicular to a direction of scanning of said scanning carriage, said first printhead being mounted in a scanning carriage in an inkjet printer along with a second printhead in a side-by-side relationship, said first printhead having a width which is greater than a width of said second printhead, wherein said first printhead ejects droplets of ink and said second printhead elects droplets of ink while scanning across said recording medium, a portion of said width of said first printhead extending beyond said width of said second printhead, said first printhead having ink election elements in a first end section, a middle section, and a second end section, said middle section being between said first end section and said second end section;

an ink ejection element control device which selectively energizes ink ejection elements within a subset of ink election elements in said first end section of said first printhead and disables all other ink election elements within said first end section at various times during a first scan as said first printhead is scanned across a recording medium to print a first partial printed pattern by said subset, and which selectively energizes ink ejection elements within a subset of ink election elements in said second end section of said first printhead and disables all other ink ejection elements within said second end section at various times during said first scan as said first printhead is scanned across said recording medium to print a second partial printed pattern by said subset;

a drive motor which transports said recording medium a distance through a print zone, said distance being a fraction of said width of said first printhead, such that an area to be printed upon during subsequent scans of said first printhead resides in said print zone, and such that said first partial printed pattern in said first scan is further or totally completed by the overlap of said second partial printed pattern in a subsequent scan; and a drive motor control device which controls said drive motor.

17. The printer of claim 16 wherein a first printed portion printed by said ink ejection elements in said first group in a scan N is overlapped by a second printed portion printed by said ink ejection elements in said first group in a next scan N+1.

18. The printer of claim 17 wherein a first printed portion printed by said ink ejection elements in said second group in said scan N is overlapped by a second printed portion printed by said ink ejection elements in said second group in said next scan N+1.

19. The printer of claim 16 wherein said width of said first printhead is approximately one-half inch and said width of said second printhead is approximately one-third inch.

* * * * *